Oct. 10, 1939.  A. H. JESSEN  2,175,940
SELECTIVE CONTROL MECHANISM FOR AUTOMOBILE TRANSMISSIONS
Filed Oct. 30, 1935  3 Sheets-Sheet 1
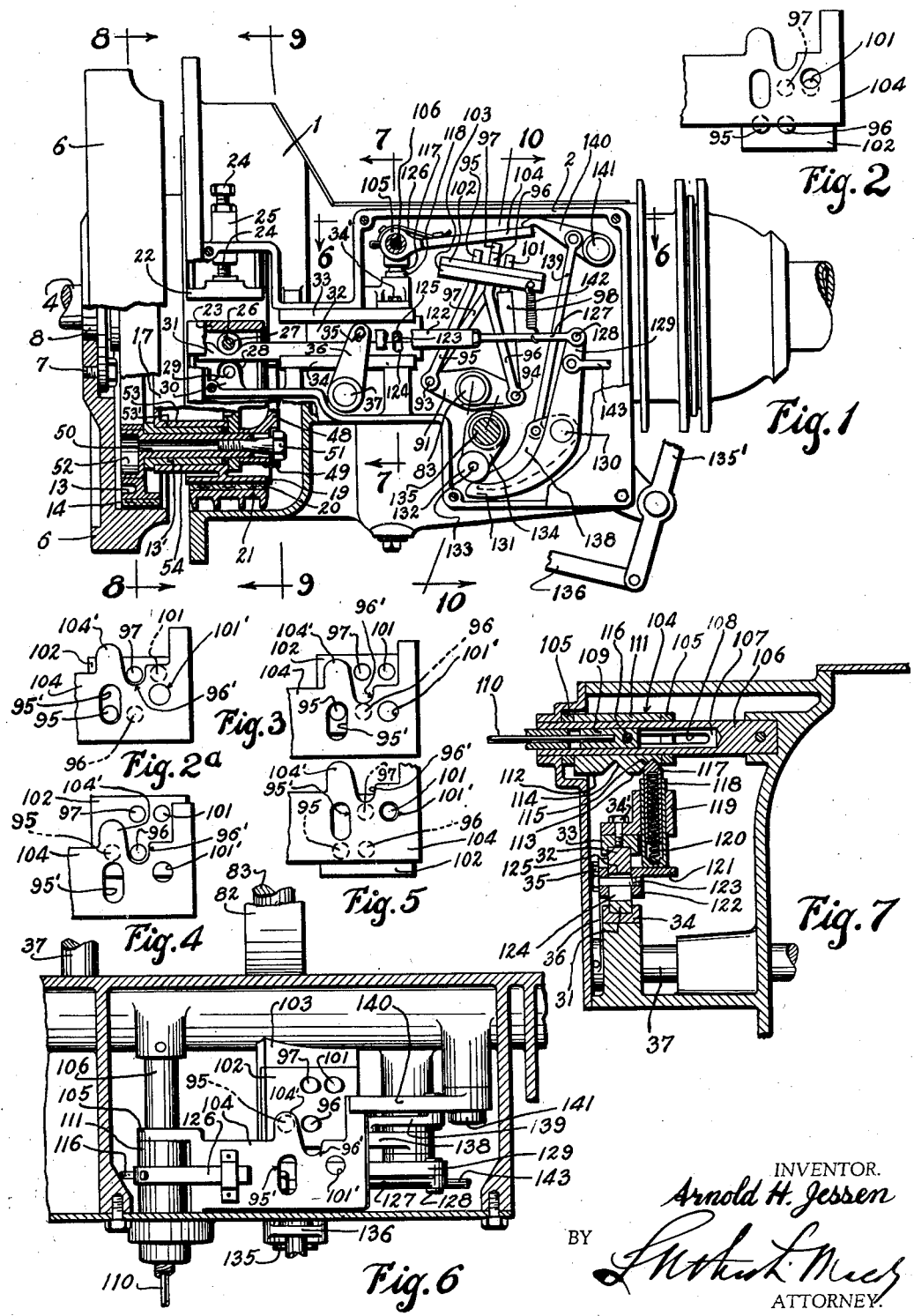
INVENTOR.
Arnold H. Jessen
BY
ATTORNEY.

INVENTOR.
Arnold H. Jessen
BY
ATTORNEY.

Patented Oct. 10, 1939

2,175,940

UNITED STATES PATENT OFFICE 2,175,940

SELECTIVE CONTROL MECHANISM FOR AUTOMOBILE TRANSMISSIONS

Arnold H. Jessen, Los Angeles, Calif.

Application October 30, 1935, Serial No. 47,449

22 Claims. (Cl. 74—262)

This invention relates to and has for an object the provision of an improved selective control mechanism for use in connection with power automotive transmissions and including manually operable selector mechanism adapted to be set for predetermining a contemplated gear change, and means operative thereafter only when a gear change becomes necessary for effecting certain gear connections in the transmission, whereby the shifting of gears is eliminated and a more comprehensive and flexible transmission means is provided, the range of speeds and power ratios is increased and their operation facilitated.

A further object of my invention is to provide a mechanism embodying certain novel and valuable improvements over a form of mechanism disclosed in my pending application for patent, Serial No. 630,639, filed August 27, 1932, to which reference is made herein in the consideration of the present application.

Other objects will appear as the description progresses.

I have shown a preferred form of mechanism embodying my improvements in the accompanying drawings, subject to modification, within the scope of the appended claims, without departing from the spirit of my invention.

In said drawings:

Fig. 1 is a side elevation of a motor embodying my invention with some of the parts shown in section.

Figs. 2, 2a, 3, 4 and 5 are diagrammatic plan views of the shifting means in positions for obtaining neutral, first, second, third and reverse speeds, respectively.

Fig. 6 is a section on line 6—6 of Fig. 1 which also shows the shifting means in a position for obtaining fourth speed.

Fig. 7 is a section on line 7—7 of Fig. 1.

Figures 8, 9, 10, 11:
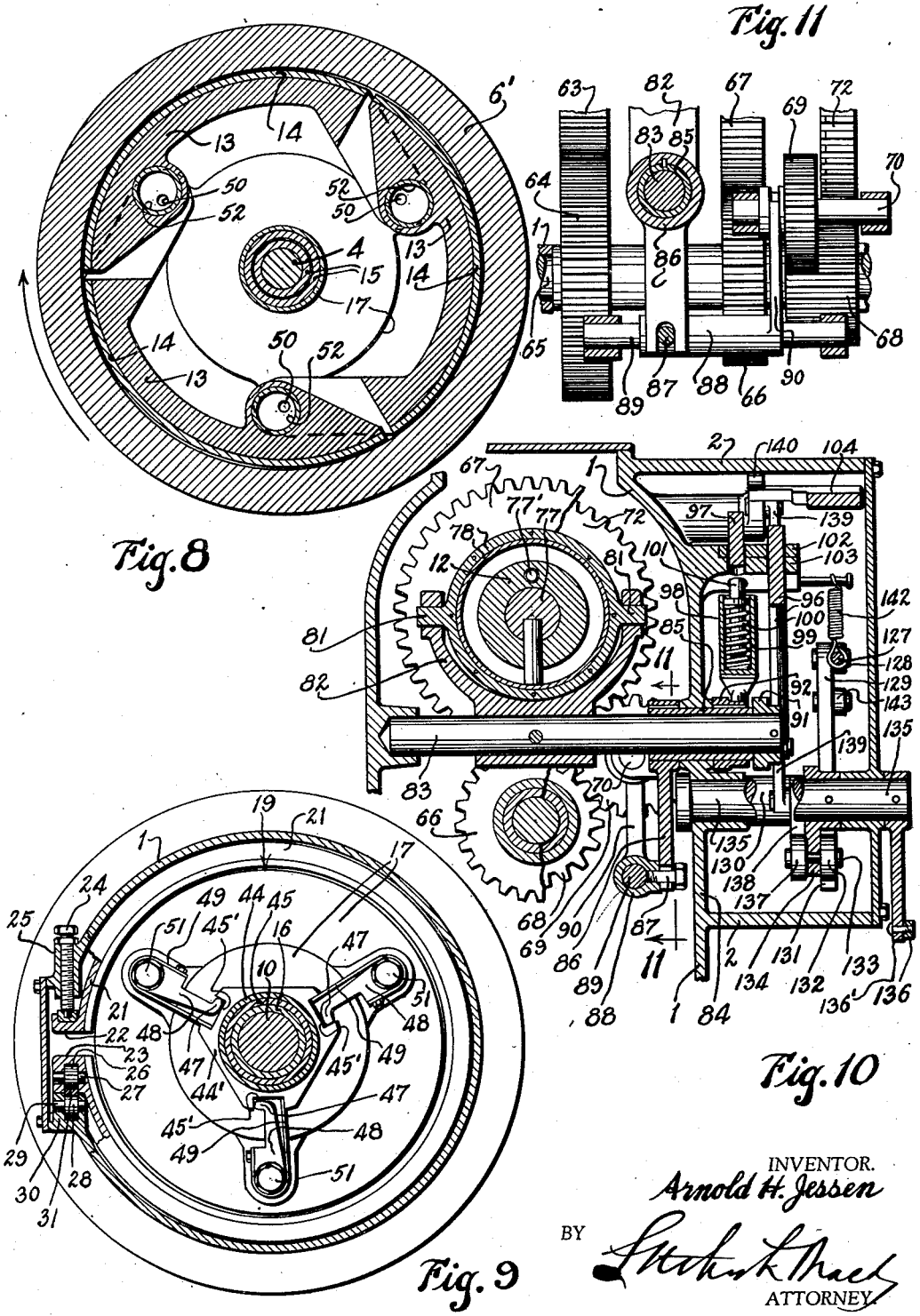

Fig. 8 is a section on line 8—8 of Fig. 1.

Fig. 9 is a section on line 9—9 of Fig. 1.

Fig. 10 is a section on line 10—10 of Fig. 1.

Fig. 11 is a section on line 11—11 of Fig. 10.

Figures 12, 13, 14:
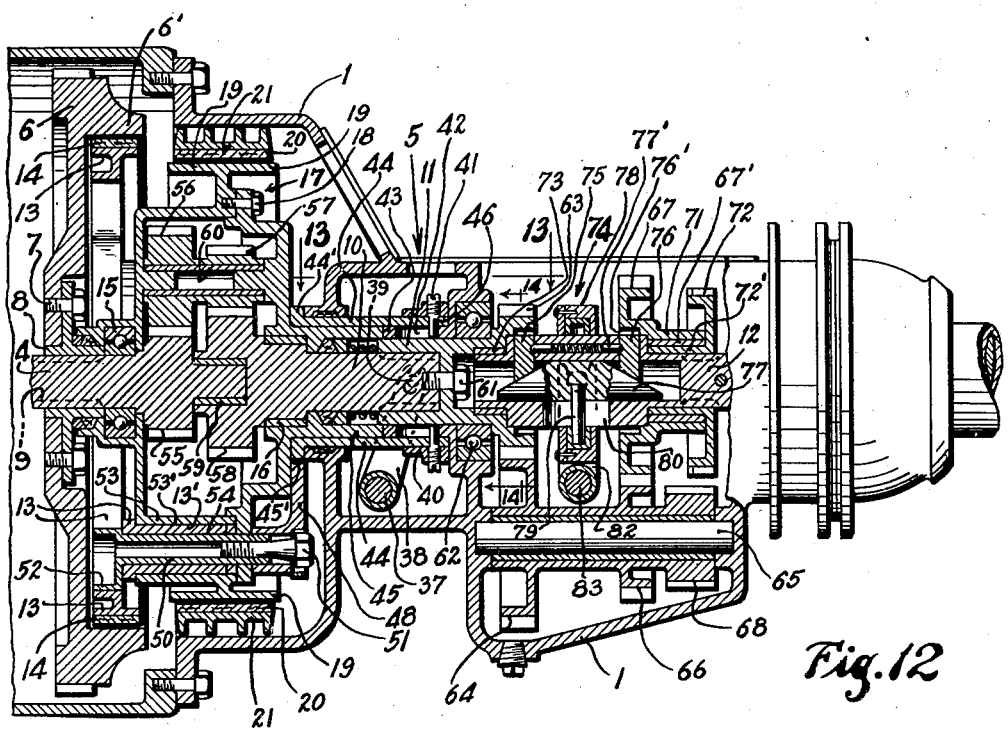

Fig. 12 is a transverse section of the transmission.

Fig. 13 is a section on line 13—13 of Fig. 12.

Fig. 14 is a section on line 14—14 of Fig. 12.

As shown, in its preferred form, a mechanism embodying my invention may be suitably enclosed in a conventional transmission housing 1 which may have an extension 2 suitably attached to or formed thereon for housing some of the operating parts not common to usual transmission mechanisms. Referring to Fig. 12 it will be observed that a shaft 4 is provided which is adapted to drive the transmission mechanism generally designated at 5 at variable speeds, as hereinafter described.

A fly wheel 6 may be secured as by means of bolts 7, or otherwise, to a coupling 8 mounted on and fixed to shaft 4 as by means of splines 9. A set of drive shafts 10, 11 and 12 are axially alined and connected with the main shaft 4 as hereinafter described for the purpose of varying the speed of the transmission mechanism through the several elements thereof.

A dual clutch mechanism is provided in association with a fly wheel 6, one unit of which has expansible clutch members and the other is provided with one or more contracting clutch devices. As shown in Fig. 8, the expanding clutch is composed of a plurality of shoes 13, 13, etc. having external linings 14 thereon which are adapted to frictionally engage the inner concentric surface of the rim 6' of the fly wheel while the contracting clutch is mounted inwardly of the expanding clutch and is associated with a planetary gearing mechanism, and the two clutches are arranged and serve the purpose as hereinafter described.

Shafts 4 and 10 are journalled in bearings 15 and 16, respectively, and serve to operatively support a housing 17 for the planetary gear train mentioned, said housing being preferably formed of a pair of members secured together as by means of bolts or screws 18. One part of the housing 17 has a concentric rim 19 which is associated with a friction lining 20 attached to the inner side of a brake band 21 and the ends 22 and 23 of said band are separated as in usual contracting clutch elements and suitably connected, as shown in Fig. 9, for contraction and expansion relative to rim 19.

For the purpose of adjusting the end 22 of band 21 relative to the end 23 of said band to compensate for wear and slack in the band and its lining, I may provide an adjusting screw 24 threaded into a boss 25 on a portion of the transmission housing 1, said band being stationary on the housing 1 while the rim 19 rotates therein. During certain cycles of operation it is necessary to tighten the band 20 around the rim 19 in order to prevent the rotation of said rim. To accomplish this purpose I provide a roller 26 carried on a pin 27 which is fixed to the end 23 of the band 20, and a second roller 28 carried on a pin 29 which is fixed in a boss 30 formed on housing 1, between which rollers a cam bar 31 is adapted to slide. (See Figs. 1 and 9.)

A bar 32 rests upon and is slidable on bar 31, but selectively operable relative to bar 31, and tracks 33 and 34 are provided for slidably supporting said bars, respectively, said tracks being of channelled cross section and held in position as by means of bolts 34' attached to the housing extension 2. Bar 32 is pivotally connected, as by means of a pin 35 to a crank arm 36 which is arranged to oscillate a shaft 37 to which said crank arm is fixed and which has a yoke 38 fixed thereto inwardly of the main transmission housing, as shown in Fig. 12.

Said yoke serves to slidably operate, as by means of trunnions 39, a flanged sleeve 40 which is held on another sleeve 44 and sleeve 40 is prevented from rotation by means of pins 41 which are threaded into sleeve 40 and have portions which engage slots 42 formed in a stationary portion 43 of housing 1 and longitudinally alined with the axis of shaft 10. Sleeve 44 is rotatably held on an extension 45 of the planetary gear housing 17 and a portion thereof extends between sleeve 40 and extension 43 and is provided with diagonal slots 46 through which the pins 41 also extend.

The end of sleeve 44 adjacent to housing 17 has a flange 44' with notches 45' formed on the periphery thereof to receive the ends 47 of cranks 48 which are held against corresponding sides of notches 45' as by means of springs 49. Cranks 48 are mounted on corresponding ends of shafts 50 and may be adjustably set thereon by means of bolts 51, the ends of said shafts being split and bolts 51 being tapered, as shown in Fig. 12, so that as said bolts are tightened the ends of the shafts 50 will be expanded and frictionally engaged with the cranks 48. The outer ends of shafts 50 have heads 52 with eccentrically formed peripheries with respect to the axes of the shafts, thereby providing cams by means of which the linings 14 of shoes 13 are frictionally engaged with the fly wheel 6.

The housing 17 serves to support and enclose a sun gear 55 and a planet gear 56, the former of which is integral with or fixed to drive shaft 4 and the latter of which is rotatable on a shaft 60 held on one or both of the housing members 17, as shown in Fig. 12, or otherwise. Drive shaft 10 also has a sun gear 58 thereon which is of larger size than gear 55 and is adapted to mesh with a gear 57 fixed for rotation with gear 56 on shaft 60.

The inner end of shaft 10 is splined to shaft 11 and may be additionally secured to shaft 11 as by means of a bolt or screw 61 so that shafts 10 and 11 will rotate together for the purpose hereinafter described. Shaft 11 is held in a bearing 62 fixed to a suitable portion of the main housing 1 and has formed on its inner end or attached thereto a gear 63 adapted to mesh with a gear 64 which is supported on a countershaft 65 on which is also mounted a spaced gear 66 fixed for rotation with gear 64 and adapted to constantly mesh with a gear 67 on shaft 12. Said countershaft 65 also carries a gear 68 fixed for rotation with gear 64 and adapted for operative connection with a reverse gear 72 through the instrumentality of an idler gear 69 carried on a stub shaft 70. (See Figs. 10 and 11.)

The extended hub 71 of gear 67 may be lined with a suitable bearing material 67' for rotatably receiving a hub 72' formed on gear 72, as shown in Fig. 12, gear 72 being mounted directly upon shaft 12 while gear 67 is indirectly supported thereon in the manner described. Shaft 12 is extended so as to receive a bearing in a suitable bore formed in the adjacent end of the shaft 11 and shaft 11 has a suitable bearing 73 forming a lining for the bore therein as in the case of gear 67. Shaft 12 has an enlarged portion intermediate gears 63 and 67 within and on which a double acting clutch mechanism 74 is supported for the purpose of selectively connecting or disconnecting, at will, the gears 63 and 67 with respect to shaft 12. Said clutch unit 74 includes radially extensible dogs 75 and 76 which are slidable through peripheral apertures in the enlarged hollow portion of shaft 12 under the influence of and controlled by a longitudinally slidable cam with similar cam extremities 77 engaging said dogs. Dogs 75 and 76 are prevented from any extension due to centrifugal force by spring tensioned pins 77'.

Said cam 77 is actuated by means of a slidable collar 78 externally held on the enlarged portion of shaft 12 and secured to said cam by means of a pin 79 extending through a slot 80 in shaft 12, as shown in Fig. 12. Collar 78 may be integrally formed or composed of sections for facilitating the assembly thereof and has trunnions 81 on opposite portions thereof for connection with a yoke 82 fixed to and oscillatable with a shaft 83 which is supported in housing 1 and is adapted for the selective engagement of the dogs 75 and 76 with their respective gears 63 and 67 so as to connect said gears operatively with shaft 12. Shaft 83 extends through a wall 84 which separates housing 1 from housing 2.

As shown in Fig. 10, shaft 83 has the major portion of its length within housing 1 while but a short portion thereof is extended into housing 2 and said shaft is journalled for oscillation in a larger hollow shaft 85 which is directly carried by wall 84 of the housing. The inner end of shaft 85 has a yoke 86 fixed thereto within housing 1 and said yoke is connected, as by means of a pin 87 with a sleeve 88 which is reciprocable on a fixed shaft 89 whenever the yoke is oscillated. An extended portion of sleeve 88 carries a yoke 90 which is operatively connected with and is adapted to slide gear 69 into and from meshing engagement with the reverse gear 72, gear 69 being constantly in mesh with gear 68 due to its wide face.

Adjacent ends of shafts 83 and 85 within housing 2 have similar oscillatable members 91 and 92 thereon with oppositely extended arms to which selector rods are pivotally attached at their lower ends, as by means of pins 93 and 94, rods 95 and 96 being attached to member 91 and rods 97 and 98 being attached to member 92, and all of said rods being extended upwardly for selective engagement with a shiftable and oscillatable selector plate 104. Rod 98 differs from the other associated rods in that it is provided with a bore 99 in an end thereof to provide a seat for a spring 100 which resiliently supports a plunger 101 forming a yieldable extension for rod 98.

By reference to Figs. 2 to 6 inclusive it will be noted that the plate 104 is peculiarly contoured at its inner margin and has apertures therein, positioned in certain definite relationships to the rods 95, 96, 97 and 98 so that one or more of said rods may extend through the plate when the same is shifted to a given position and other rods will completely clear the inner margin of the plate, while one or more others will be engaged by the bottom surface of the plate for moving said rods downward.

The rods 95, 96, 97 and 98, however, project through and are guided in their vertical movement by means of a guide plate 102 which is stationarily mounted on a bracket 103 formed on the transmission housing, as shown in Fig. 10. The selector plate 104 is longitudinally shiftable and also pivotally held on a transverse shaft 106 and has a bifurcated portion 105 which slides on said shaft. Shaft 106 has a central bore 107 therein with a peripheral slot 108 communicating with said bore through which a pin 116 extends from an internally slidable nut 109 for connecting said nut with an external sleeve 111 enveloping shaft 106, as shown in Fig. 7. Nut 109 is secured to an end of a stiff but flexible wire 110 which extends outwardly from the end of shaft 106 and is adapted for manual operation for the purpose of adjusting plate 104 longitudinally on said shaft.

Sleeve 111 is positioned between furcations 105, 105, of plate 104 and has cam faces 112 and 113 and notches 114 and 115 alternating therewith. Although sleeve 111 may shift longitudinally of its shaft it may not oscillate independently thereof because of the pin 116 which connects nut 109 with said sleeve, thereby maintaining said sleeve in constant engagement with a spring held follower pin 117, as shown in Fig. 7.

Pin 117 is yieldably held in a bore of a larger pin 118 which, in turn, is movably held in a boss 119 formed on housing 2, a spring 120 being enclosed by and within bores provided in said pins and having its opposite extremities bearing against opposite ends of said bores for urging the pins in opposite directions, thereby holding pin 117 in engagement with the notches and cams of sleeve 111 and pin 118 in constant engagement at its lower end with a lug 121 formed on a side of a clevis 122, the furcations of which are connected by a bolt 123 which is operable for selective engagement with a notch 124 in bar 31 or a notch 125 in bar 32. A spring 126 is attached at an end to sleeve 111 and has its free end connected to said plate 104 for urging said plate upwardly and permits the yielding of said plate downwardly for the purpose hereinafter described.

Clevis 122 is connected by means of a rod 127 at a point 128 to the upper arm 129 of a bell crank which is pivotally held on a fixed shaft 130 suitably journalled in the housing of the transmission. Said crank has a toe 131 so shaped as to form a cam disposed in the path of a roller 132 which is rotatably held on a pin 133 carried by an oscillatable crank arm 134, said crank arm being fixed to a foot-pedal operated shaft 135. The foot-pedal 135' which may be mounted on housing 2 or otherwise may be connected by a link 136 or otherwise to an arm 136' secured to an end of said shaft 135.

Pin 133 also carries on the opposite side of crank 134 from roller 132 a roller 137 which operates to engage and serves to depress the toe of a crank 138 which is independently carried on shaft 130, and a rod 139 connects crank 138 with a finger 140 which is pivoted on a fixed shaft 141 and overlies and is operable for depressing the shift plate 104. A spring 142 is connected at its opposite ends to rod 127 and guide plate 102 and serves to urge the clevis 122 upwardly, while a rod 143 may be employed for connecting crank arm 129 with a suitable spring or tensioning device (not shown) for urging the crank arm to an operative position, which position is to the left as seen in Fig. 1.

It will be noted that the toe 131 is so shaped that the roller 132 will continue to hold said toe in the depressed position even while the crank arm 134 continues in the direction required to depress the crank 138.

In operation, the shiftable plate 104 controls the selection of the gear ratios as said plate is moved longitudinally of its shaft 106 by means of the manually operable wire 110, thereby serving to selectively position said plate with respect to the upwardly extending rods 95, 96, 97 and 98, (or 101), as illustrated in Figs. 2, 2a, 3, 4, 5 and 6.

Simultaneous with the selective positioning of said plate relative to said rods the cams 112 or 113 or the notches 114 or 115 are selectively positioned with respect to the pin 117, said cams and notches being formed on sleeve 111 slidable with said plate. (See Fig. 7.)

It will be noted that plate 104 has an inner projecting lug 104' and an outer elongated aperture 95' which are in the plane of the rod 95, an inner recess 96' in the plane of the rods 96 and 97, and a single round aperture 101' in the plane of the rod 101.

Thus, when the plate 104 is shifted to first or "low" gear position, aperture 95' will be positioned over rod 95 so that said rod may be extended through said aperture, recess 96' will be positioned over rod 97 so that said rod 97 may be extended through said recess, and the rods 96 and 101 will be in a position to be depressed by the solid part of the plate and with the same longitudinal movement of said plate the cam 112 is moved into registration with the pin 117 so as to cause the depression of said pin and thereby compress and increase the power of the spring 120. (See Figs. 2a and 7.)

Thereafter the foot pedal 135' is depressed, moving the crank 134 in a counter-clockwise direction, depressing the toe 131 and thereby moving the clevis 122 to the left until the notches 124 and 125 are alined, all as seen in Fig. 1.

Now, the power of spring 120 being sufficient, the tension of spring 142 is overcome by pressure on lug 121 thereby forcing the pin 123 into notch 124, if said pin had previously engaged notch 125. If, in a prior shifting of gears, pin 123 has been seated in notch 124 said pin will remain in notch 124 when the pedal 135' is operated, as just described.

A continued depression of the foot pedal in the same direction causes the roller 137 to depress the toe of crank 138, thereby depressing the plate 104 by means of the rod 139 and the finger 140; said plate striking and depressing the rod 96 and thus causing a movement of dog 76 into operative engagement with the gear 67 by means of the arm 91, shaft 83, yoke 82, trunnions 81, sleeve 78, pin 79 and cam 77.

The completion of the shift into first gear is accomplished by the release of the foot pedal 135' permitting a tension device (not shown) connected to rod 143 to move clevis 122, pin 123 and bar 31 to the right as seen in Fig. 1 until the cam portion adjacent the end of bar 31 and the roller 26 actuates the band 21 to frictionally engage the rim 19 for stopping the rotation of housing 17 thereby assuring a drive through the planetary gears within said housing. Shoes 13 do not engage the fly wheel 6 in "first" gear. Thus a "first" or multiple reduction of speed for shaft 12 from shaft 4 is accomplished by means of the gears 55, 56, 57 and 58, shafts 10 and 11 and gears 63, 64, 66 and 67 and dog 76.

Depression of the pin 101 by the plate 104 during the just described operation renders the reverse gear inoperative, as will be hereinafter described.

For a "second" gear ratio, plate 104 is shifted so that rods 97 and 101 will be clear of said plate, rod 96 will be covered by said plate for effecting a depression of said rod, and aperture 95' will be over rod 95 so as to permit the upward movement of said rod, and notch 114 will be moved over pin 117 so that said pin will raise into said notch thereby reducing the power of the spring 120. (See Figs. 3 and 7.)

The foot pedal 135' is now depressed as in "first" speed, aligning notches 124 and 125, but because spring 120 has been weakened, spring 142, now relatively stronger, restores the clevis 122 to its upward position, causing pin 123 to enter notch 125, and with the subsequent release of said foot pedal (as described in a first gear change) bar 32 is moved to the right, as seen in Fig. 1, thereby sliding the sleeve 40 to the left (see Figs. 12 and 13) by means of pin 35, crank 36, shaft 37, yoke 38 and trunnions 39. Pins 41 move with sliding sleeve 40 and engage the slots 46 of sleeve 44 so as to oscillate sleeve 44 and actuate the cranks 49 by means of the notches 45' thereby oscillating shafts 50 and cams 52 for frictionally engaging the shoes 13 with the fly wheel 6.

But before the foot pedal is released, as just described, said pedal is further depressed as in "first" speed, for depressing the shift plate 104 and the consequent subsequent depression of rod 96, thus moving dog 76 into operative engagement with gear 67 as cam 77 is moved to the left (see Fig. 12) in the same manner as described in making a "first" speed change. Therefore, in "second" gear, shaft 12 is driven from shaft 4 through fly wheel 6, shoes 13, housing 17, shafts 10 and 11, gears 63, 64, 66 and 67 and dog 76.

For obtaining a "third" gear ratio the plate 104 is shifted to cover the rod 95 only, and simultaneously moves the cam 113 over the pin 117 so as to depress said pin for increasing the power of spring 120 as hereinbefore described. (See Figs. 4 and 7.)

Depression of plate 104 by the means hereinbefore described depresses rod 95, thereby moving cam 77 to the left (see Fig. 12) by the means hereinbefore described, so that dog 75 operatively engages gear 63. Hence the subsequent release of the foot pedal will permit the locking of housing 17 against rotation so that in "third" gear the drive for shaft 12 from shaft 4 will be through gears 55, 56, 57 and 58, shafts 10 and 11 and dog 75.

To obtain a "fourth" gear ratio the plate 104 is shifted so as to clear the rods 96, 97 and 101 and to position lug 104' over rod 95 and to position notch 115 over pin 117 thereby decreasing the power of spring 120. (See Figs. 6 and 7.)

It should be clear from the foregoing description that the depression of rod 95 causes the engagement of dog 75 with gear 63, and the weakening of spring 120 permits movements for engaging shoes 13 with fly wheel 6. Thus, the drive in "fourth" gear ratio for shaft 12 from shaft 4 is in effect a direct drive through fly wheel 6, shoes 13, housing 17, shafts 10 and 11 and dog 75.

When "reverse" gear connection is desired, shift plate 104 is moved so as to overlie rods 95, 96 and 97 but with the aperture 101' above rod 101 and the cam 112 depressing the pin 117 thereby compressing and increasing the power of spring 120.

It will be noted that Fig. 1 shows the rod 97 as being longer than the other rods 95 and 96 to the same extent that the said other rods are distant above the plate 102 when said other rods are in the neutral position.

It is this extra length of rod 97 that enables said rod to be depressed by the plate 104 (to shift to "reverse" gear) without depressing the said other rods below their respective neutral positions, thereby oscillating the member 92, hollow shaft 85 and yoke 86 to slide the sleeve 88 with the yoke 90 which moves the reverse idler gear 69 into meshing engagement with the reverse gear 72.

Thereafter upon the release of the foot pedal, the mechanism described in connection with a shift to "first" gear locks the housing 17 against rotation so that the drive in reverse gear of shaft 12 from shaft 4 is by means of the gears 55, 56, 57 and 58, shafts 10 and 11, gears 63, 64, 68, 69 and 72, said gear 72 being splined to shaft 12.

I will now describe the use of the spring 100:

When shifting to "first" gear from "reverse" gear it is obviously necessary that the transmission be removed from "reverse" gear before the transmission is shifted to "first" gear. When the transmission is in "reverse" gear the rod 98, and consequently the rod 101, is in its uppermost position with the spring 100 interposed between said rods. Thus, as the plate 104 depresses the rod 101, spring 100 will depress the rod 98 until the plate has just touched the top of rod 96 (which will be in the neutral position as seen in Fig. 1) at which time the transmission will have been geared in "neutral" (see Fig. 2). A further depression of plate 104 and rod 96 to shift the transmission into "first" gear (see Fig. 2a) will compress the spring 100 because it will not be desired to move the reverse operating mechanism to any further extent.

From the foregoing description of the structure and operation of my improvements it will be apparent that I have provided a transmission mechanism in connection with a selective control means therefor, which is capable of operation for predetermining a contemplated gear shift, regardless of the existing connections within the transmission, together with means which is effective at the time the actual change in power ratio becomes necessary, upon the restoration of the clutch pedal to normal position.

Thus, a vehicle operator approaching a stop signal at an intersection, or other cases where it appears necessary to stop or change the speed of the vehicle, may operate the wire 110 for making a selection of first, second or third gear ratios, as may seem necessary, following which he may depress the pedal 135', and after making the stop, proceed at the changed ratio by releasing pressure of said pedal.

The mechanism shown and described, while not being completely automatic in operation, relieves an operator of the necessity for shifting gears in order to change the power ratios and reduces the number of operations and the complexity of driving to a minimum. Other advantages will readily appear to those skilled in the art of transmission of power and motor vehicle operation.

What I claim as my invention and desire to secure by Letters Patent, is:

1. A selective control means for automotive transmissions comprising: in combination with a driving shaft and a driven shaft, and a transmission sliding gear type unit arranged for variable connection for varying the power ratio between said driving and driven shafts, of manually operable means adapted to be set at a plurality of positions selectively to correspond to the several gear changes of said transmission unit for predetermining a gear change, a planetary transmission unit cooperating with said first named transmission unit for varying the power ratio between said shafts and manually operable means adapted to be operated subsequent to the operation of said first manually operable means for substantially simultaneously operating said two transmission units.

2. A selective control means for automotive transmissions comprising: in combination with a driving shaft, a driven shaft, clutch means arranged for operatively connecting said driving and driven shafts, and a transmission unit including a plurality of gears arranged for variable connection for varying the power ratio between the driving and driven shafts; a manually operable selector adapted to be set for predetermining a contemplated gear change, a plurality of members engageable with and under the influence of said selector and respectively corresponding to the several obtainable gear changes of said transmission unit, and manually operable means adjustable relative to said clutch means and to said gears, for effecting a contemplated gear change subsequent to the setting of said selector, said clutch means including an annular clutch member fixed to and rotating with said driving shaft, a rotatable housing supporting certain of said gears and a clutch element operative against said annular clutch member.

3. A selective control means for automotive transmissions comprising: a driving shaft, a driven shaft, a transmission unit operatively connecting said shafts at variable ratios of power, gear changing means intermediate said driving and driven shafts, a selector adjustable to different gear changing positions, shiftable means in said transmission for rendering selected gear connections operative, means adjustable with said shiftable means into engagement with said selector, and manually operable means for rendering said shiftable means effective for completing a predetermined gear change, said shiftable means including oscillatable members, selector rods pivoted on said members, and said selector including an oscillatable plate cooperating with said rods.

4. A selective control means for automotive transmissions comprising: axially alined driving and driven shafts, clutch means connected with said driving shaft, a transmission unit intermediate said shafts and including gears arranged for variable connections for varying the power ratio between said shafts, shiftable means in said transmission unit for selectively connecting certain of the gears thereof, a manually operable selector operatively connected with and for operating said shiftable means so as to predetermine a gear change, and a manually operable member for actuating said selector, said shiftable means including oscillatable members, selector rods pivoted on said members, and said manually operable selector including a bodily movable and oscillatable selector plate cooperating with said rods.

5. A selective control means for automotive transmissions comprising: axially alined driving and driven shafts, clutch means connected with said driving shaft, a transmission unit intermediate said shafts and including gears arranged for variable connections for varying the power ratio between said shafts, shiftable means in said transmission unit for selectively connecting certain of the gears thereof, a manually operable selector operatively connected with and for operating said shiftable means so as to predetermine a gear change, and a manually operable member for actuating said selector, said shiftable means including a plurality of devices engageable with and influenced by said selector for completing selected gear changes, said selector being formed so as to engage and depress certain of said devices and to clear certain other of said devices upon the operation of the selector, and including an apertured, bodily slidable and oscillatory plate.

6. A selective control means for automotive transmissions comprising: a driving shaft and a driven shaft, a plurality of gears intermediate and for selective connecting said shafts at variable speeds, shiftable means connecting certain of said gears at variable ratios of power and speed, a manually shiftable and oscillatory selector for predetermining a desired gear change, means intermediate said shiftable member and said selector and under the influence of said selector for initiating a gear change, and manually operable means including a member engageable with and for oscillating said selector for completing a gear change.

7. A selective control means for automotive transmissions comprising: in combination with axially alined driving and driven shafts and dual transmission units intermediate said shafts; shiftable means associated with each of said transmission units for affording variable power ratios between said shafts, a manually operable selector for predetermining a given power ratio, means intermediate said shiftable means and said selector and operable by said selector for changing the power ratio of one of said units, and manually operable means effective upon an operation in a given direction for actuating said selector and upon a restoration thereof for changing the power ratio of said other transmission unit.

8. A selective control means for automotive transmissions comprising: driving and driven shafts, dual transmission means for operatively connecting said shafts at variable speeds and including separate trains of gears, shiftable means for each of said transmission means, manually operable means for actuating said shiftable means, and a selector also manually operable prior to the operation of said first mentioned manually operable means for predetermining a desired driving ratio, said first mentioned manually operable means being adapted to operate the shiftable means of both of said transmission means.

9. A selective control means for automotive transmissions comprising: a driving shaft, a driven shaft, clutch means associated therewith, dual sets of transmission gears intermediate said shafts, separate shiftable devices associated with said transmission gear sets, a manually operable member operatively connected with and for operating said shiftable devices for effecting a desired gear change, a manually operable selector shiftable for predetermining a gear change, and means connected with said shiftable devices and engageable with said selector for completing a gear change upon the operation of said manually operable member.

10. A selective control means for automotive transmissions comprising: a driving shaft, a driven shaft, clutch means associated therewith, dual sets of transmission gears intermediate said shafts, separate shiftable devices associated with said transmission gear sets, a manually operable member operatively connected with and for operating said shiftable devices for effecting a desired gear change, a manually operable selector shiftable for predetermining a gear change, and means connected with said shiftable devices and engageable with said selector for completing a gear change upon the operation of said manually operable member, said last mentioned member being operative effecting the change of gears in said transmission units when it is moved in opposite directions, respectively.

11. A selective control means for automotive transmissions comprising: a driving shaft, a driven shaft, a primary transmission unit and a secondary transmission unit interposed between said shafts for variably connecting the same, separate shifting means for each of said units, common means for operating said shifting means, a manually operable selector for predetermining a gear change in said units, and connections between at least one of said transmission units and said selector for completing a gear change upon the operation of said operating means.

12. A selective control means for automotive transmissions comprising: a driving shaft, a driven shaft, a primary transmission unit and a secondary transmission unit interposed between said shafts for variably connecting the same, separate shifting means for each of said units, common means for operating said shifting means, a manually operable selector for predetermining a gear change in said units, and connections between at least one of said transmission units and said selector for completing a gear change upon the operation of said operating means, said connections including a member for each possible gear change.

13. A selective control means for automotive transmissions comprising: driving and driven shafts, primary and secondary transmission units each composed of a plurality of gears arranged for variable connection, separate shiftable means associated with each of said units for varying the power ratio between said shafts, a common manually operable member for jointly operating said shiftable means, a shiftable selector for predetermining desired gear connections in said units, and means connecting said manually operable member with the shifting means of each of said units and with said selector, whereby the operation of the manually operable means will complete the desired gear changes.

14. A selective control means for automotive transmissions comprising: driving and driven shafts, primary and secondary transmission units each composed of a plurality of gears arranged for variable connection, separate shiftable means associated with each of said units for varying the power ratio between said shafts, a common manually operable member for simultaneously operating said shiftable means, a shiftable selector for predetermining desired gear connections in said units, and means connecting said manually operable member with the shifting means of each of said units and with said selector, whereby the operation of the manually operable means will complete the desired gear changes, said transmission means including clutch means and a brake means adapted to be rendered selectively operative by said manually operable means, said brake means including a stationary band, a rotary housing which is surrounded by said band, and connections between said housing and said clutch means.

15. A selective control means for automotive transmissions comprising: driving and driven shafts, primary and secondary transmission units each composed of a plurality of gears arranged for variable connection, separate shiftable means associated with each of said units for varying the power ratio between said shafts, a common manually operable member movable for substantially simultaneously operating said shiftable means, a shiftable selector for predetermining desired gear connections in said units, and means connecting said manually operable means with the shifting means of each of said units and with said selector, whereby the operation of the manually operable means will complete the desired gear changes, said transmission means including clutch means and a brake means adapted to be rendered selectively operative by said manually operable means.

16. A selective control means for automotive transmissions comprising: a driving shaft, a driven shaft, clutch means associated with said shafts and composed of a clutch unit including a brake, a transmission unit also associated with said shafts and composed of a plurality of gears arranged for variable connection for affording variable power ratios between said shafts, a manually shiftable selector for predetermining a desired power ratio between said shafts, and means including a single control mechanism for selectively rendering said clutch and brake operative and for effecting desired gear changes in said transmission unit.

17. A selective control means for automotive transmissions comprising: a driving shaft, a driven shaft, clutch means associated with said shafts and composed of a clutch unit including a brake, a transmission unit also associated with said shafts and composed of a plurality of gears arranged for variable connection for affording variable power ratios between said shafts, a manually shiftable selector for predetermining a desired power ratio between said shafts, and means including a single control mechanism for selectively rendering said clutch and said brake operative and for effecting desired gear changes in said transmission unit, said means also including separate shiftable devices for said clutch and transmission unit, and a manually operable member for actuating said shiftable devices.

18. In a selective control means for automotive transmissions, a driving shaft, a driven shaft, a variable speed planetary transmission unit, a variable speed sliding gear type transmission unit, means inter-connecting said units in different gear speed ratios with one another in the various forward gear drives and reverse gear drive and said shafts thereby to vary the power ratio between said shafts upon changing the speed ratio of said units, and manually operable means for substantially simultaneously changing the speed ratio in said transmission units.

19. In a selective control means for automotive transmissions, driving and driven shafts, dual transmissions arranged to jointly operate in different gear speed ratios with one another in the various forward gear drives and reverse gear drive to vary the power ratio between said shafts, one of said transmissions being of the change speed planetary type and the other of the sliding gear type, and means for simultaneously operating said transmissions for causing them to vary the power ratio between said shafts.

20. In a selective control means for automotive transmissions, driving and driven shafts, dual transmissions arranged to jointly operate in different gear speed ratios with one another in the various forward gear drives and reverse gear drive to vary the power ratio between said shafts, one of said transmissions being of the change speed planetary type and the other of the sliding gear type, means for simultaneously operating said transmissions for causing them to vary the power ratio between said shafts, said planetary transmission including driving and driven members, clutch means for drivingly connecting said members, said clutch means including shoes and a friction band into and out of clutching engagement with which said shoes are movable, means connecting said shoes together for joint bodily movement of the shoes into and out of clutching position including eccentric members, and means for rotating said eccentric members when said transmission operating means is operated to simultaneously control said transmissions.

21. In a selective control means for automotive transmissions, comprising driving and driven shafts, dual transmissions for operatively connecting said shafts at variable speeds and including separate gear trains of which one is of the planetary change speed type and the other is of the shifting gear change speed type, shiftable means for each of said transmissions, and a common manually operable means for substantially simultaneously operating said shiftable means, and a selector also manually operable prior to the operation of said common manually operable means for predetermining a desired driving ratio.

22. In a selective control means for automotive transmissions comprising a driving and a driven shaft, dual transmissions for operatively connecting said shafts at variable speeds, one of said transmissions being of the planetary type and means for simultaneously operating both transmissions, said planetary transmission including clutch including friction shoes movable bodily into and out of clutching position, rotatable eccentric members connecting said shoes together and being rotatable to bodily move said shoes, and means operated when said transmission operating means is actuated for rotating said eccentric members, said last named means including an oscillatory sleeve having notches therein, crank arms having their free ends engaged in said notches, spring means yieldably holding said free ends against corresponding sides of the notches and permitting movement of said ends relative to the notches, and means connecting said crank arms with said eccentric members, whereby the latter are rotated upon movement of said crank arms as effected upon oscillation of said sleeve.

ARNOLD H. JESSEN.